United States Patent [19]
Muhlfelder et al.

[11] 3,999,729
[45] Dec. 28, 1976

[54] BACKUP WHEEL FOR A THREE AXIS REACTION WHEEL SPACECRAFT

[75] Inventors: Ludwig Muhlfelder, Livingston; Norman Urton Huffmaster, Willingboro, both of N.J.

[73] Assignee: RCA Corporation, New York, N.Y.

[22] Filed: Mar. 20, 1975

[21] Appl. No.: 560,361

[52] U.S. Cl. .......................... 244/165; 235/150.2; 244/3.21; 318/563; 318/610
[51] Int. Cl.² .......................................... B64G 1/20
[58] Field of Search ............ 33/321; 73/1 E, 178 R; 74/5.34; 235/150.2; 244/3.2, 3.21, 77 R, 77 M, 77 SS, 165, 171; 318/563, 610

[56] References Cited
UNITED STATES PATENTS

| | | | |
|---|---|---|---|
| 3,350,033 | 10/1967 | Goldberg | 244/165 |
| 3,493,194 | 2/1970 | Kurzhals | 244/165 |
| 3,696,282 | 10/1972 | Hirokawa et al. | 318/610 X |

OTHER PUBLICATIONS

Cummings, J. A. et al., *Skewed Versus Orthogonal Reaction Wheels for Outer Planet Exploration*, AAS Conference, Seattle, Wash., 6–1971.

*Primary Examiner*—Stephen G. Kunin
*Attorney, Agent, or Firm*—Edward J. Norton; Joseph D. Lazar

[57] ABSTRACT

Three-axis attitude control of a substantially zero momentum satellite is achieved by a control system which includes three mutually orthogonal reaction wheels and a fourth backup reaction wheel. The backup wheel is mounted on an axis which is skewed with respect to the axes of the three mutually perpendicular wheels. Spacecraft attitude is normally maintained by torques developed by the mutually orthogonal wheels. If one and only one of the orthogonal wheels should fail to correct the attitude error on its associated axis, the backup wheel is caused to rotate and develop a torque to maintain spacecraft attitude.

9 Claims, 9 Drawing Figures

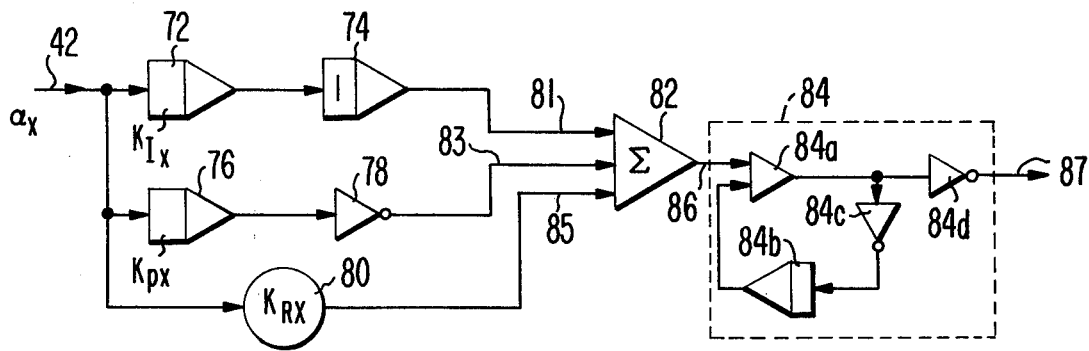
Fig. 3 — BLOCK 32 (OR 34 OR 36) OF FIG. 2
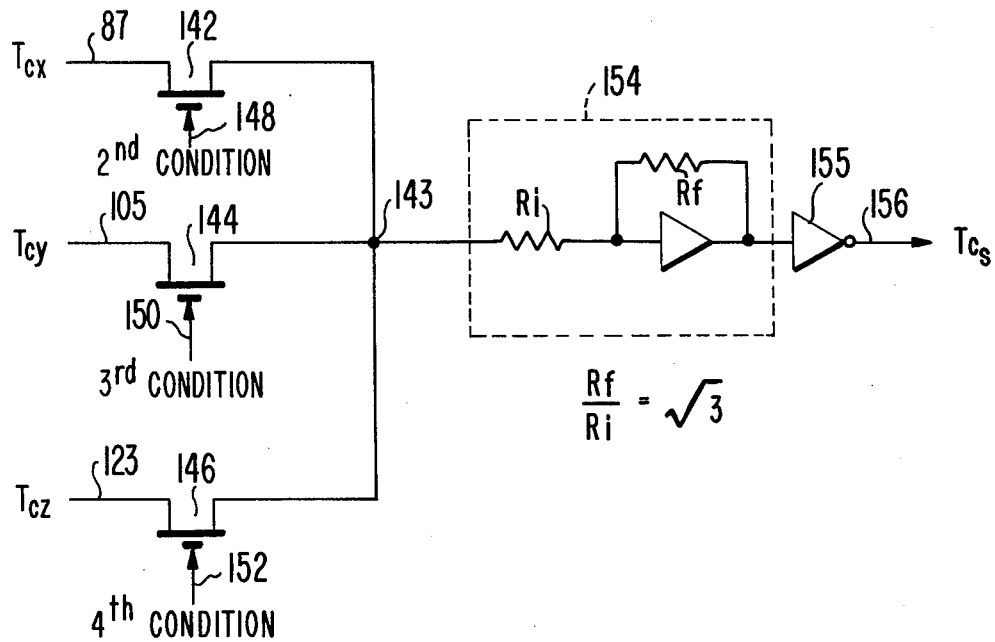
Fig. 5 — BLOCK 38 OF FIG. 2

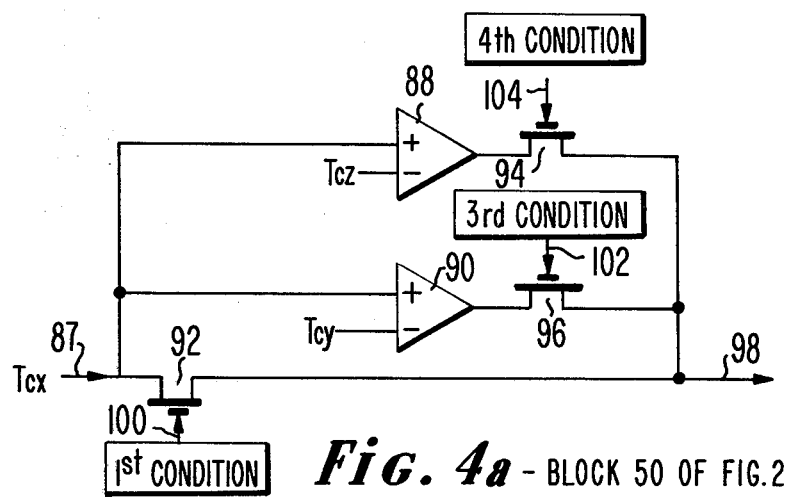
FIG. 4a - BLOCK 50 OF FIG. 2
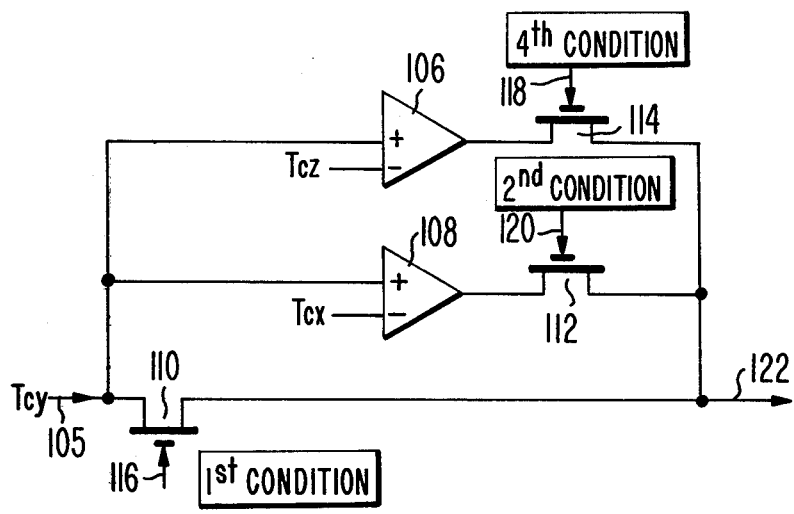
FIG. 4b - BLOCK 52 OF FIG. 2
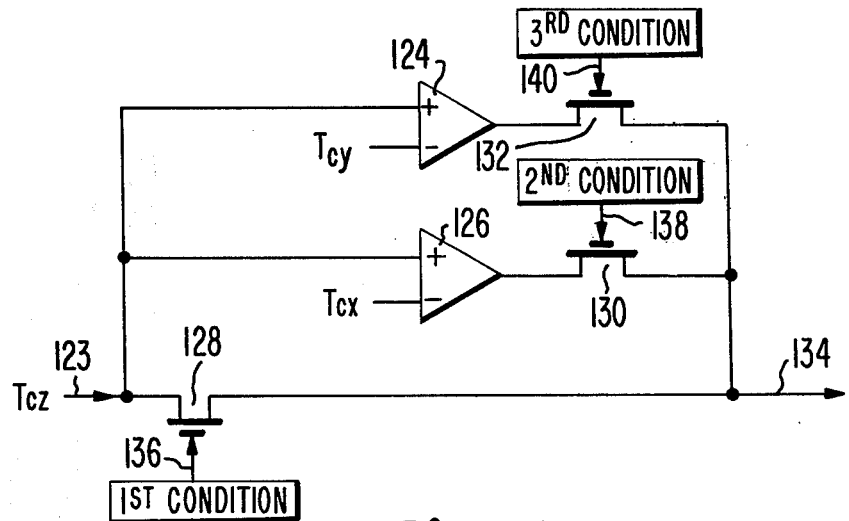
FIG. 4c - BLOCK 54 OF FIG. 2

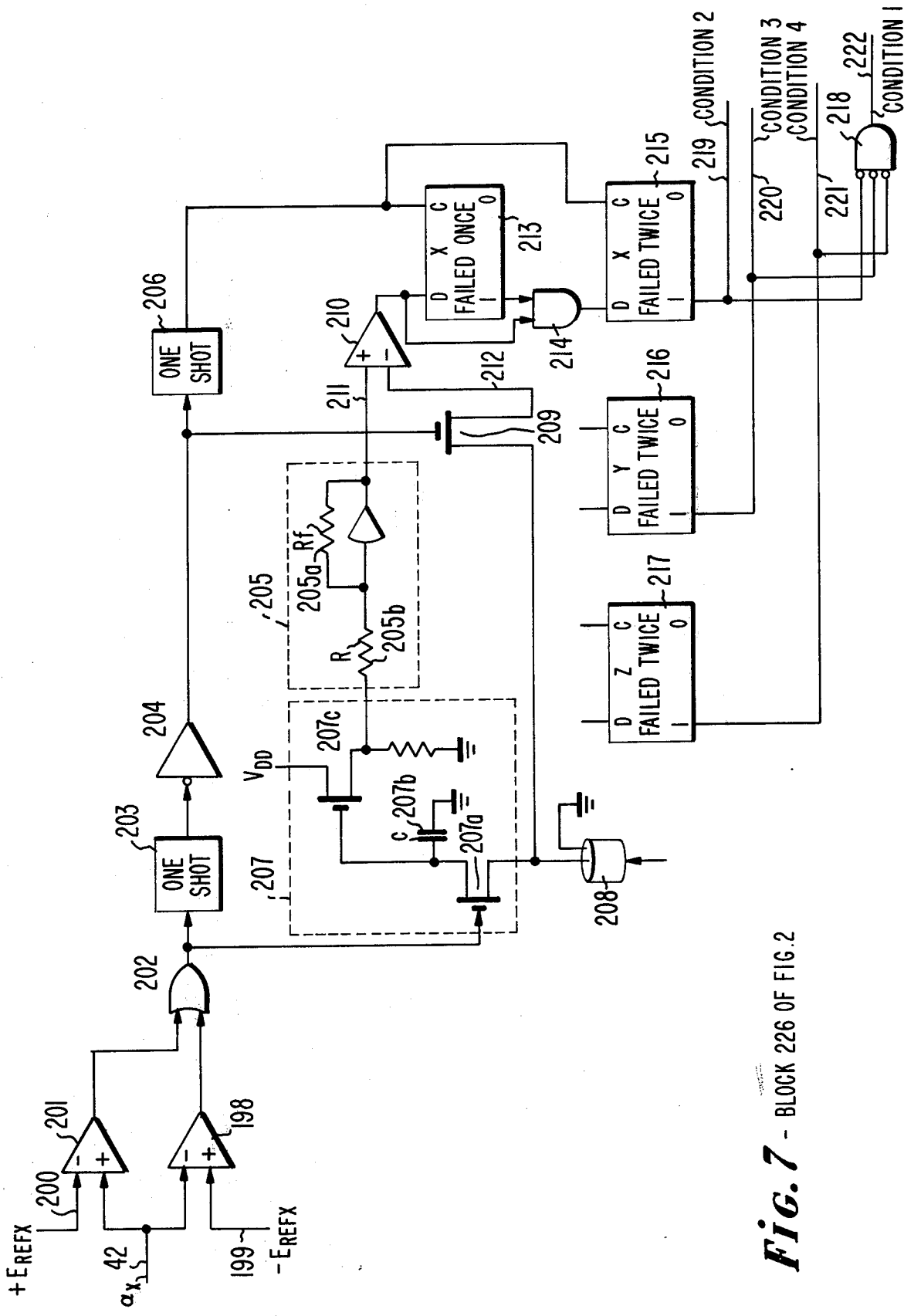
FIG. 7 - BLOCK 226 OF FIG. 2

BACKUP WHEEL FOR A THREE AXIS REACTION WHEEL SPACECRAFT

The invention herein described was made in the course of or under a contract or subcontract thereunder with the United States Air Force.

CROSS REFERENCE TO RELATED APPLICATIONS

Of interest is the following copending patent application which is assigned to the same assignee as the present application: Ser. No. 557,318, filed Mar. 11, 1975, entitled "Minimization of Spacecraft Attitude Error Due to Wheel Speed Reversal," based on the invention of J. S. Pistiner.

BACKGROUND OF THE INVENTION

1. Field of the Invention

This invention relates to a zero-momentum spacecraft and more particularly to a backup reaction wheel to be used with an orthogonal three wheel attitude control system.

2. Description of the Prior Art

Certain earth oriented satellites use a three axis reaction wheel set for attitude control. Increased pointing precision in attitude control can be achieved by means of control torques developed by three reaction wheels in response to sensor-derived attitude error information. The three reaction wheels are usually mounted in the spacecraft in such a manner that their axes are parallel to an orthogonal set of body axes about which attitude control is to be maintained. For an earth-pointing spacecraft, one of the wheel axes is parallel to the spacecraft pitch axis which nominally rotates about the orbit normal at one revolution per orbit. The other two wheel axes are aligned with the spacecraft roll and yaw axes, respectively. In the absence of large external disturbance torques, such a spacecraft system is referred to as a substantially zero-momentum system because the reaction wheel momentum variations about zero would be minimal when the spacecraft products of inertia are small.

A failure of any one of the three orthogonal wheels results in the loss of the satellite's precise attitude control. Many systems have been proposed heretofore for avoiding the problems associated with such a wheel failure. Some prior art attitude control systems use backup wheels on each axis to avoid the problems associated with primary wheel failure. Other prior art attitude control systems use multiple reaction wheels arranged in a non-orthogonal system. Each of the enumerated prior art systems have basic disadvantages in that backup wheels on each axis entail additional cost, weight, and size whereas non-orthogonal arrangements require more complex control laws. In the non-orthogonal arrangement, a wheel has torque components on each of the three orthogonal axes about which attitude control is to be maintained. A reaction wheel which is aligned with an orthogonal axis has no torque components along the other two axes comprising the three axis mutually perpendicular set. Accordingly, good conventional design procedures dictate the use of an orthogonal three axis wheel arrangement to achieve attitude control. It is desirable, therefore, to provide a single backup wheel to be used in place of any one of the three mutually perpendicular reaction wheels.

SUMMARY OF THE INVENTION

According to the invention, a substantially zero momentum spacecraft is provided with a backup reaction wheel to be used in place of one of the three orthogonal wheels making up the spacecraft's three axis attitude control system. Spacecraft three axis attitude is determined by the use of suitable sensors. In response to attitude error signals from the sensors, control means generate attitude control signals to the three mutually perpendicular reaction wheels mounted on the spacecraft. A backup reaction wheel is mounted on the spacecraft on an axis which is skewed with respect to the three mutually perpendicular axes. Malfunction of any one of the primary wheels is detected by malfunction detection and testing means. In response to signals from the detection means, the control means activate the backup wheel and change the attitude signals to the non-malfunctioning wheels.

BRIEF DESCRIPTION OF THE DRAWING

FIGS. 3, 4a, 4b, 4c, 5, and 7 are detailed circuit schematics of the control law logic portion of the system shown in FIG. 2.

DESCRIPTION OF THE PREFERRED EMBODIMENT

Before proceeding to a description of the method and system of the preferred embodiment of the invention, a description of a conventional substantially zero momentum spacecraft three axis attitude control system will be given.

Figure 1:
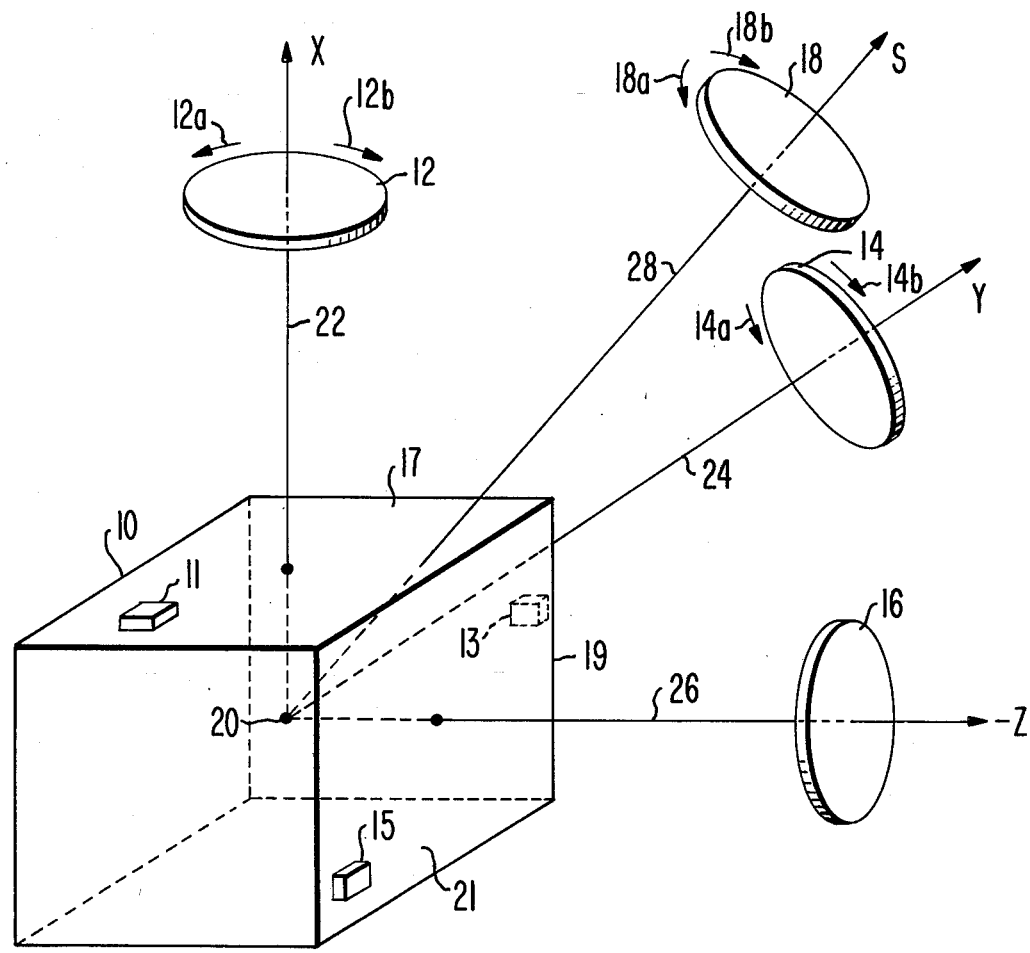
FIG. 1 is a diagram in perspective of a spacecraft showing the primary and skewed backup reaction wheel axes related to one embodiment of the invention.

Referring now to FIG. 1, there is shown a body 10 which may be a spacecraft or satellite. For sake of simplicity, body 10 is shown in a rectangular configuration but any other shape may be utilized as well. For instance, the body 10 can be oblate, cylindrical and so on, the important point being that the body 10 has a center of mass designated as 20. Emanating from the center of mass 20 are three mutually perpendicular directions depicted as three axes 22, 24, 26 which are respectively designated alternatively as the X or yaw axes 22; Y or roll axis 24; and −Z or pitch axis 26. The three axes 22, 24, 26 comprise the spacecraft's 10 principal axes. The axis system as defined and used herein according to the usual convention is right handed in the order X, Y, Z. Mounted on the spacecraft 10 are three reaction wheels yaw 12, roll 14, and pitch 16 in such a manner that their axes are parallel to the orthogonal set of body axes 22, 24, 26. For an earth pointing spacecraft the X and Y reaction wheels 12, 14 undergo two speed reversals per orbit as a result of gyroscopic cross-coupling between the wheels. Thus, as indicated by arrows 12a, 12b, 14a, 14b, wheels 12, 14 may rotate in either direction. The Z wheel 16 normally does not undergo any speed reversals as there is no gyroscopic cross-coupling on the Z axis 26. Suitable motor controls, not shown, cause wheels 12, 14, 16 to change their speed and/or direction of rotation. Wheel speeds typically range from −8000 to +8000 rpm. As is well known in the spacecraft art, wheels 12, 14, 16 act as gyroscopes and impart stiffness or stability to spacecraft 10 along axes 22, 24, 26, respectively. Wheels 12, 14, 16, mounted respectively on the (Y) 24, (X) 22, and (−Z) 26 axes normally provide the necessary torques to maintain the spacecraft's attitude. Spacecraft's 10 attitude may be disturbed by internal and external torques acting on each axis 22, 24, 26. External torques may occur as a result of the gravity gradient, solar radiation, or electromagnetic energy, while internal torques occur as a result of gyroscopic cross coupling. These internal and external torques if not compensated for, change the attitude or relationship of spacecraft 10 axes 22, 24, and 26 with respect to fixed reference points. These fixed reference points may be defined by any combination of the sun, stars, or the horizon of the earth. If one of the wheels 12, 14, 16 comprising the orthogonal set becomes unable to compensate for the internal and external disturbance torques acting along its axis 22, 24, 26, spacecraft 10 will not be maintained in its desired attitude.

Three axis attitude of spacecraft 10 is determined as is well known in the art by suitable sensors 11, 13, 15. Sensor 11 is mounted in the Y-Z plane 17, sensor 13 is mounted in the X-Z plane 14, and sensor 15 is mounted in the X-Y plane 21.

According to the present invention, a backup or skewed reaction wheel 18 is mounted on the spacecraft in such a manner that its axis is parallel to the S or skew axis 28. Axis 28 emanates from the spacecraft's 10 center of mass 20 and is skewed with respect to each of the orthogonal axes (X) 22, (Y) 24, and (Z) 26.

Backup reaction wheel 18 is arranged to be normally not rotating but arranged so that it can be caused to rotate in either direction as indicated by arrows 18a, 18b and develop a torque of the proper magnitude to maintain the attitude of spacecraft 10 upon the malfunctioning of any one of the principal axes wheels 12, 14, 16.

Figure 2:
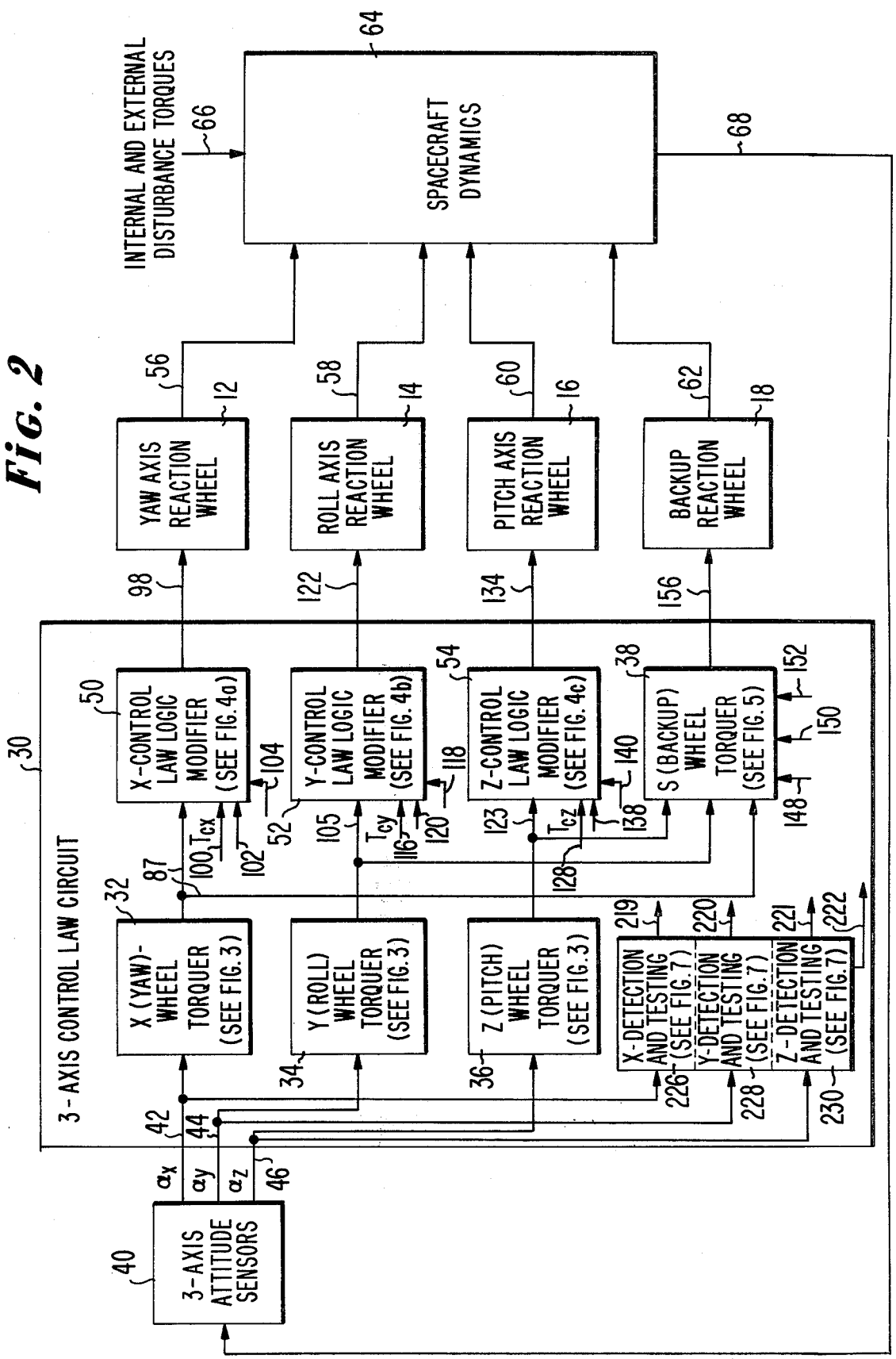
FIG. 2 is a block diagram of the control loop of a spacecraft embodying the present invention.

Referring now to FIG. 2, there is shown a block diagram of the three axis attitude control system according to the present invention, illustrating, in general, the components of a spacecraft attitude control system arranged according to the present invention. Certain features in more detail shown in FIGS. 3–6 will be described later.

Suitable attitude sensors 40 typically comprising alone or in combination gyroscopes, sun sensors, star sensors, and earth horizon sensors of conventional design are placed on the spacecraft to sense the attitude error about each of spacecraft's 10 orthogonal axes 22, 24, 26. As is well known in the spacecraft attitude control art, the sensors provide means to generate signals representing an error from a fixed reference point or axis. For example, a star sensor installed on the spacecraft to sense the error on axes 22, 24, 26 and if one of the axes on which it is mounted should be misoriented with respect to the reference, a deviation signal indicating attitude error will be generated. Signals representing respectively the attitude errors 42, 44, 46 of each axis 22, 24, 26 are coupled to the three axis control circuit 30, which is arranged to calculate in response to those error signals the torque command to be sent to each wheel 12, 14, 16, 18 so as to compensate for the attitude error on axes 22, 24, 26. This attitude error may be caused by a malfunctioning principal axis wheel.

Control circuit 30 comprises torquer circuits 32, 34, 36, 38 shown in more detail in FIGS. 3 and 5, for wheels 12, 14, 16, 18 respectively in combination with control law modifying logic circuits 50, 52, 54, shown in more detail in FIGS. 4a, 4b, and 4c, and malfunction detection and testing circuits 226, 228, 230 shown in more detail in FIG. 7 for wheels 12, 14, 16, respectively. The output 219 for X detection circuit 226 is connected to the inputs 120, 138, and 148, of circuits 52, 54, and 38, respectively. The output 220 of Y detection circuit 228 is connected to the inputs 102, 140, and 150 of circuits 50, 54, and 38, respectively. The output 221 of Z detection circuit 230 is connected to the inputs 104, 118, and 152 of circuits 50, 52, and 38, respectively. The output 222 which represents a common output from detection circuits 226, 228, 230 is connected to the inputs 100, 116, and 136 of circuits 50, 52, 54, respectively. The operation of control circuit 30 will be described later. The torque command for each of the wheels 12, 14, 16 is a function of the attitude error or deviation of the axes 22, 24, 26 on which the wheel is mounted.

To meet the attitude accuracy requirements a type II servo or control system is used, to develop the wheel torque commands or attitude control signals for wheels 12, 14, 16. As is well known in the control system art, a type II system has a constant positional error due to a parabolic or constant-acceleration input term. For the type II system, the torque commands $T_{cx}$, $T_{cy}$, $T_{cz}$ to wheels 12, 14, 16, respectively are determined by:

$$T_{ci} = K_{Pi}\, \alpha_i + K_{Ri}\dot{\alpha}_i + K_{Ii} \int \alpha_i dt \qquad (1)$$

where $i$ can be either $X$, $Y$, or $Z$, $K_{Pi}$ is the proportional gain, $\alpha_i$ is the attitude error; $\dot{\alpha}_i$ is the attitude rate error, $K_{Ri}$ is the rate gain and $K_{Ii}$ is the integral gain. It is to be understood that Equation (1) is the general expression for the wheel torque command developed to a Type II system. To obtain the wheel torque command for the X axis wheel 12, $i$ of Equation (1) would be replaced by X. Similarly $i$ would be replaced by Y or Z to obtain the torque command for the Y wheel 14 or Z wheel 16. If more stringent attitude accuracy requirements are imposed then instead of using a Type II servo or control system to develop the attitude control signals, a Type III servo system may be required. As is well known in the art, a Type III system has a constant positional error due to an input term which is the differential of acceleration. This input is commonly referred to as "jerk." For the Type III system, the torque commands to wheels 12, 14, 16 would be determined by an expression identical to that for the Type II system with the exception that an additional term, $K_{III} \iint \alpha_i dt dt$ would be added on to the expression of Equation (1). This additional term, commonly referred to as the double integral term, distinguishes the control law of a Type III system from that of a Type II system.

The wheel torque commands calculated and generated by circuit 30 are coupled to wheels 12, 14, 16 through suitable motor controls, not shown, so as to cause wheels 12, 14, 16 to develop control torques and hence change their speed and/or direction of rotation and thereby compensate for both internal and external disturbance torques which may have caused spacecraft 10 axes 22, 24, 26 to deviate from the correct or desired attitude.

If one of the orthogonal wheels 12, 14, 16 is unable to compensate for the attitude errors on its associated axis 22, 24, 26, control circuit 30 will cause a wheel torque command to be issued to backup wheel 18. The inability of a wheel to compensate for the attitude error may arise as a result of the wheel not rotating at the required speed or rotating in the wrong direction or not rotating for an extended period of time. The occurrence of any one of these conditions prevents the wheel from developing the needed compensation torque thereby giving rise to an appreciable attitude error. After sensing, the "failing" or malfunctioning orthogonal wheel 12, 14, or 16 will not be issued a wheel torque command and it ceases to operate. Backup wheel 18 will then rotate in either direction depending on the error to be corrected in response to its wheel torque command and develop a torque which will have components on all three orthogonal axes 22, 24, 26. The torque components that backup wheel 18 develops on each of the orthogonal axes 12, 14, 16 depends on the angle skew axis 28 is oriented with respect to each of the orthogonal axes 22, 24, 26. Preferably skew axis 28 is oriented at 54.74° with respect to each of the orthogonal axes 22, 24, 26 as this angle gives equal components of backup wheel 18 torque on each orthogonal axis 22, 24, 26 as will be described in more detail hereafter. To maintain proper attitude, backup wheel 18 must develop a torque which effectively replaces the torque that would have been developed by the failed wheel 12, 14, 16. Further, as backup wheel 18 will have torque components on all three axes and thus on those axes of the orthogonal set whose associated wheels 12, 14, 16 have not malfunctioned, the wheel torque commands to these nonmalfunctioning wheels 12, 14, 16 must be adjusted so that proper orientation and attitude is maintained.

These adjustments in wheel torque command are calculated by control logic 30 as will be described later. For a spacecraft where skew axis 28 is oriented at 54.74° with respect to each of the orthogonal axes 22, 24, 26, the torque commands to wheels 12, 14, 16, 18 are given in Table 1.

TABLE 1

| CONDITION | TORQUE COMMANDS | | | |
|---|---|---|---|---|
| | X(Yaw) | Y(Roll) | Z(Pitch) | S(Skewed) |
| All orthogonal wheels operable | Tcx | Tcy | Tcz | 0 |
| X or Yaw wheel malfunctioned | 0 | Tcy-Tcx | Tcz-Tcx | 3 Tcx |
| Y or roll wheel malfunctioned | Tcx-Tcy | 0 | Tcz-Tcy | 3 Tcy |
| Z or pitch wheel Malfunctioned | Tcx-Tcz | Tcy-Tcx | 0 | 3 Tcz |

When all orthogonal wheels 12, 14, 16 are operable, the wheel torque commands calculated by control logic 30 from Equation (1) are issued to the respective wheels 12, 14, 16 with backup wheel 18 having no torque command and thus not rotating. If the X or yaw wheel 12 should malfunction, a wheel torque command, $T_{cs}$, will be issued to the skew wheel 18 which is proportional as shown by Table 1 to the wheel torque command calculated by Equation (1), for X wheel 12. The torque command $T_{cs}$ issued by control logic 30 to backup wheel 18 is then:

$$T_{cs} = \sqrt{3}\ Tcx$$

As backup wheel 18 is oriented at 54.74° with respect to each of the orthogonal axes 22, 24, 26, the component of backup wheel 18 torque on each orthogonal axis, $T_{csi}$, 22, 24, 26 is:

$$T_{csi} = T_{cs} \cos 54.74$$
$$T_{csi} = (Tcs/\sqrt{3})$$

where
$i = X, Y, Z.$

Thus, backup wheel 18 develops a torque component, $T_{cx}$, on X axis 22 which is the same torque that would have been developed by the wheel torque command from control logic 30 to X axis wheel 12. Further as backup wheel 18 also develops the torque component $T_{cx}$, on the Y and -Z axes 24, 26, this torque component must be subtracted from the wheel torque command issued by control logic 30 to these wheels 14, 16.

For example, control logic 30 computes the wheel torque command $T_{cy}$, for the Y axis wheel 14. Backup wheel 18 has a torque component $T_{cx}$ on the Y axis 24. To maintain proper spacecraft attitude, the wheel torque command to Y axis wheel 14 must be modified as shown in Table 1 so that the total torque command at Y axis wheel 14 is $T_{cy}$. In a similar manner, the wheel torque command to -Z axis wheel 16 is also modified to take into account the component of backup wheel 18 torque on the Z-axis 26. Similarly, if it is the Y (14) or Z (16) wheel that should malfunction, the wheel torques are adjusted by the torque command that would have been issued by control logic 30 to the malfunctioned wheel 14, 16. If skew axis 28 is not oriented at 54.74° with respect to each of the orthogonal axes 22, 24, 26, then backup wheel 18 will produce unequal components of torque on the orthogonal axes 22, 24, 26, and the wheel torque commands to orthogonal wheels 12, 14, 16 must be modified accordingly.

Spacecraft dynamics 64 is the response of spacecraft 10 to the torques 56, 58, 60, 62 developed by wheels 12, 14, 16, 18 respectively, and to the internal and external disturbance torques 66. Wheel torques 56, 58, 60, 62 and disturbance torques 66 cause spacecraft 10 to change the attitude of each of its three axes 22, 24, 26. Sensors 40, as explained previously, indicate whether the three axis attitude deviates from the desired spacecraft 10 attitude.

Referring now to FIGS. 3–5 and 7, there are shown detailed schematics of the control law logic portion forming circuit 30 shown in FIG. 2. FIG. 3 is an analog circuit whch may be used to implement the expression for the X wheel 12 torque command. The circuit of FIG. 3 corresponds to the X (yaw) wheel torquer 32 of control law circuit 30. For the Y and Z wheels 14, 16 there are torquer circuits 34, 36 (FIG. 2) which are identical to the circuit of FIG. 3 with the exception that Y wheel torquer 34 has input 44 and output 105 and Z wheel torquer 36 has input 46 and output 123.

The circuit of FIG. 3 comprises three operational amplifiers 72, 74, 76 suitably arranged to act as integrators, a summing amplifier 82 and an implicit differentiator 84. Differentiator 84 comprises a high gain amplifier 84a in combination with integrator 84b and inverters 84c and 84d. The operation of this X-wheel torquer circuit (FIG. 3) will now be explained in detail. The operation of the circuits for the Y and Z axes 24, 26 will be identical and accordingly need not be described further.

The wheel torque command, $T_{cx}$, for the X-axis wheel 12 is based on Equation (1) with $i = x$ $$T_{cx} = K_{Px}\ \alpha_x + K_{Rx}\ \alpha_x + K_{Ix} \int \alpha_x dt \qquad (2)$$

The circuit of FIG. 3 functions to first calculate the integral of the wheel torque command $\int T_{cx} dt$ which is determined as:

$$\int T_{cx} dt = K_{Rx} \alpha_x + K_{Px} \int \alpha_x dt + K_{Ix} \iint \alpha_x dt dt \qquad (3)$$

As can be seen, Equation (3) is the integral of Equation (2). The integral of the wheel torque command is the output 86 of summing amplifier 82. Summing amplifier 82 is an operational amplifier suitably arranged as is well known in the art to have an output voltage 86 which is equal to the sum of its input voltages 81, 83, 85. The output voltage 86 of summing amplifier 82 is then differentiated by differentiator 84 to give the X-axis wheel torque command of Equation (2).

The input to the circuit of FIG. 3 is the X-axis attitude error $\alpha_x$ 42. This attitude error is determined by the 3-axis attitude sensors 40 (FIG. 2). Integrators 72 and 74, arranged in series, integrate the attitude error ($\alpha_x$ 42) such that the input 81 to summing amplifier 82 is the double integral term of Equation (3). Integrators 72 and 74 are operational amplifiers suitably arranged with resistors and capacitors to perform the mathematical operation of integration. As is well known in the art, the gain of an operational amplifier acting as an integrator is directly proportional to the inverse of the product of the amplifier's associated resistor and capacitor. The gain of integrator 72 is adjusted to be equal to $K_{Ix}$, the integral gain of the X axis wheel torque command, Equation (2). The gain of integrator 74 is adjusted to be unity such that the total gain of the path comprising integrators 72, 72 is $K_{Ix}$. Thus, the input 81 to summing amplifier 82 is:

$$K_{Ix} \iint \alpha_x dt dt \qquad (4)$$

Similarly the gain of integrator 72 is adjusted such that the input 83 to summing amplifier 82 is:

$$K_{Px} \int \alpha_x dt \qquad (5)$$

where $k_{Px}$ is the proportional gain of the X axis wheel torque command. Inverter 78 is used to maintain proper signal convention at input 83 as integrator 76 not only integrates but also inverts signals such that its output is proportional to the negative of the integral of the input. Input 85 to summing amplifier 82 is:

$$K_{Rx} \alpha_x \qquad (6)$$

where $K_{Rx}$ 80 is the rate gain for the X-axis wheel 12 torque command.

The output voltage 86 of summing amplifier 82 is the integral of the X-axis wheel 12 torque command (Equation 3). This output voltage 86 is then differentiated by differentiator 84 to give the X-axis wheel 12 torque command (Equation 2). As stated previously, the circuit of FIG. 3 represents only one of three identical wheel torque command circuits. The circuits for the Y-axis and Z-axis wheels 14, 16 function in exactly the same manner as explained above for the X-axis wheel 12 circuit.

Referring now to FIGS. 4a–c there are shown three identical analog logic circuits corresponding to the three control law logic modifier circuits 50, 52, 54 of FIG. 2. There is one circuit for each of spacecraft's 10 three orthogonal axes 22, 24, 26. The circuit of FIG. 4a is for X axis 22, FIG. 4b for Y axis 24, and FIG. 4c for Z axis 26. The input to each of these circuits comes from the corresponding wheel torquer circuits 32, 34, 36 of FIG. 2. The output command signals 98, 122, 134 of FIGS. 4a–4c are coupled to the corresponding reaction wheels 12, 14, 16 through suitable motor drives, not shown. Under normal operation, the orthogonal wheels 12, 14, 16 are properly operated or functioning and there is no torque command issued to the backup wheel 18. If one and only one of the orthogonal wheels 12, 14, 16 should not be operating properly, it is then necessary to modify as shown in Table I the wheel torque commands issued to the remaining orthogonal wheels which are still properly operating. The circuits of FIG. 4a–4c determine if the wheel torque command calculated by the circuit of FIG. 3 should be sent directly to the corresponding wheel or should be modified according to Table I. The operation of the circuits will now be described in detail.

FIG. 4a is comprised of 3 metal oxide silicon field effect transistors (MOS FETS) 92, 102, 104 and two operational amplifiers 90 and 88 serving as summing amplifiers. FETS 92, 102, and 104 function as ON/OFF switches. The circuits of FIGS. 4b and 4c are also comprised of three FETS and two operational amplifiers.

Four possible conditions exist for the reaction wheels 12, 14, 16, 18. These conditions are tabulated in Table II.

TABLE II

| CONDITION | RESULT |
|---|---|
| 1st | Orthogonal wheels operating properly (functioning) |
| 2nd | X-axis wheel not operating properly (malfunctioning) |
| 3rd | Y-axis wheel not operating properly (malfunctioning) |
| 4th | Z-axis wheel not operating properly (malfunctioning) |

The existence of these conditions can be determined by the malfunction detection and testing circuit of FIG. 7 to be described later. Examining now FIG. 4a it is seen that the bias 100 of FET 92 is controlled by the first condition. Normally the FETS 92, 94, 96 are open circuits. If the first condition should occur then FET 92 will conduct and thus allow the input 87 $T_{cx}$ of FIG. 4a to be connected directly to the output 98. In a similar manner for FIGS 4b and 4c, when the first condition has occurred, FET 110 of FIG. 4b will conduct and will allow the input 105 $T_{cy}$ to be connected directly to the output 122. For FIG. 4c, FET 128 will conduct allowing the input 123 $T_{cz}$ to be connected directly to the output 134. Thus, it is seen from FIGS. 4a through 4c, that for the first condition the wheel torque signal commands, computed by wheel torquers 32, 34, 36 (FIG. 2) for each of spacecraft's 10 three orthogonal axes 22, 24, 26, are directly coupled to the output of FIGS. 4a–4c.

Occurrence of the second condition indicates that the X axis wheel is not operating properly and therefore, as shown in Table I, the wheel torque commands to the Y axis wheel 14 and the Z axis wheel 16 must be modified accordingly. Referring now to FIGS. 4b and 4c it is seen that when the second condition occurs, the required modification in the Y axis wheel 14 and Z axis wheel 16 wheel torque commands will take place. More particularly, it is seen from FIG. 4b that when the second condition occurs, FET 112 will close, allowing the input signal 105, $T_{cy}$, to be connected through summing amplifier 108 to the output 122. Summing amplifier 108 acts as a subtractor, the output signal of summing amplifier 108 being $T_{cy} - T_{cx}$. Referring to Table I this output signal is the modification that is required in the wheel torque command to the Y axis wheel 14 when the X axis wheel is malfunctioning. Similarly, it is seen from FIG. 4c, that, when the second condition occurs, FET 130 conducts allowing the input signal 123 $T_{cz}$ to be connected through summing amplifier 126 as the output signal 134. For the second condition, the output signal of FIG. 4c is $T_{cz} - T_{cx}$, which is the modification required in the Z axis wheel command when the X axis wheel 12 is malfunctioning.

The third condition indicates that the Y axis wheel is malfunctioning. Referring to Table I it is seen that under this condition the X axis wheel 12 torque command and the −Z axis wheel 16 torque command signal must be modified. These modifications will take place as shown in FIGS. 4a and 4c. Referring to FIG. 4a it is seen that when the third condition occurs, FET 96 conducts thereby allowing input signal 89 $T_{cx}$ to be connected through summing amplifier 90 as the output signal 98. The output signal 98 is $T_{cx} - T_{cy}$ which corresponds to the modification required on the X axis wheel command when the Y axis wheel is malfunctioning. For the −Z axis wheel command, it is seen from FIG. 4c that when the third condition occurs, FET 132 conducts allowing the input signal 123 $T_{cz}$ to be connected through summing amplifier 124 as output signal 134. The output signal 134 is $T_{cz} - T_{cy}$ which corresponds to the modification required as shown in Table I.

When the −Z axis wheel is not operating properly, this is indicated by the fourth condition. Referring to Table I, it is seen that when the fourth condition occurs, it is necessary to modify the torque commands to the X axis wheel 12 and the Y axis wheel 14. The required modification in the X axis wheel 12 wheel torque command signal is shown in FIG. 4a. For the fourth condition, FET 94 conducts allowing the input signal $T_{cx}$ to be connected through summing amplifier 88 as output signal 98. Output signal 98 is then $T_{cx} - T_{cz}$ which is the required modification in the wheel torque command signal to the X axis wheel 14 when the −Z axis wheel is not operating properly. For the fourth condition, FET 114 (FIG. 4b) conducts allowing the input signal 105 $T_{cy}$ to be connected through summing amplifier 106 as output signal 122. Output signal 122 is then $T_{cy} - T_{cz}$ which is the modification required in the Y axis wheel command when the −Z axis wheel is malfunctioning. Summing amplifiers 88, 90, 106, 108, 124, and 126 are operational amplifiers suitably arranged as is well known in the art to perform the operation of subtraction.

Referring now to FIG. 5, there is shown that portion 38 of the control law circuit 30 (FIG. 2) which is used to determine the wheel torque command signal $T_{cs}$ to backup wheel 18. The circuit of FIG. 5 comprises three FETS 142, 144, and 146, in combination with operational amplifiers 154 and an inverter 155. As can be seen from FIG. 5, the FETS 142, 144, 146 act as ON/-OFF switches. Normally, they are open circuits and the FETS close to thus conduct when the particular condition occurs. For example, FET 142 will close and therefore act as a short circuit when the second condition occurs.

The operation of FIG. 5 will now be described in detail. The second condition (Table II) indicates that the X axis wheel is no longer operating properly. From Table I it is seen that when this condition occurs, the torque command signal $T_{cs}$ to backup wheel 18 must be equal to the $\sqrt{3} T_{cx}$. When the second condition occurs FET 142 closes allowing the input signal $T_{cx}$ to FET 142 to appear at the input 143 to operational amplifier 154. Operational amplifier 154 is suitably arranged as is well known in the art to have a gain which is $\sqrt{3}$. Thus the output of operational amplifier 154 is $\sqrt{3} T_{cx}$. Inverter 155 inverts the op. amp. output signal in order to maintain proper sign convention. Similarly when the third condition indicating that the Y axis wheel is malfunctioning occurs, FET 144 closes allowing the input signal $T_{cy}$ to be connected to the input 143 of operational amplifier 154. This gives rise to an output 156 which is $\sqrt{3} T_{cy}$. In a similar manner when the Z axis wheel 16 is not operating properly (fourth condition) the output 156 will be $\sqrt{3} T_{cz}$. The output signal 156 of FIG. 5 is connected directly to the motor drive (not shown) of the backup wheel 18. This output signal will then cause the backup wheel 18 to rotate and produce the torque which is necessary to maintain three axis attitude control for spacecraft 10. If it is either the X wheel 12 or Y wheel 14 that has malfunctioned backup wheel 18 must rotate in either direction as these wheels 12, 14 undergo two speed reversals per orbit for an earth pointing spacecraft. If the Z wheel 16 has malfunctioned backup wheel 18 need rotate in only one direction as Z wheel 16 undergoes no speed reversals for an earth pointing spacecraft.

Referring now to FIG. 7, there is shown an analog circuit which may be used to detect and test for X wheel 12 malfunction. The circuit of FIG. 7 corresponds to block 226 of control law circuit 30. For the Y and Z wheels 14, 16, there are detection and testing circuits 228, 230 (FIG. 2) which are identical to the circuit of FIG. 7 with the exception that Y detection and testing circuit 228 has input 44 and output 220 and Z detection and testing circuit 230 has input 46 and output 221.

The circuit of FIG. 7 comprises a bipolarity comparator formed of elements 198, 201, and OR gate 202; two one shots 203, 206, inverter 204, summing amplifier 205, a sampler and holder 207, X wheel tachometer 208, FET 209, comparator 210, and gate 214, and flip-flops 213, 215. The tachometer 208 measures the speed and direction of rotation of X axis wheel 12. Wheel speed and direction of rotation may also be determined by other techniques well known in the art. One of these techniques consists of mounting Hall elements in the gap between rotor and stator of the wheel's associated motor drive. The output of the Hall elements as is well known in the art is then proportional to the speed of the wheel and also indicates direction of rotation. The bipolarity comparator is available as a standard element such as RCA type CA 3060. Sampler and holder 207 comprises two FETS 207a, 207c, in combination with capacitor 207b. Flip-flops 216, 217 represent the outputs 220, 221, respectively, of the Y and Z detection and testing circuits 228, 230 of FIG. 2. NAND gate 218 as will be explained later, represents a common output from detection circuits 226, 228, 230, and determines the first condition of Table II. The operation of this X detection and testing circuit, FIG. 7, will now be explained in detail. The operation of the circuits 228, 230 for the Y and −Z axes 24, 26 will be identical and accordingly need not be described further.

An excessive attitude error of the spacecraft's 10 X axis 22, is an indicator of possible malfunction of the associated reaction wheel 12. When such an attitude error occurs, it is necessary to test the wheel by commanding it to increase its speed by a certain amount. This increase in wheel speed must occur within a fixed interval of time. If the wheel is unable to pass this test two or more times in succession, the wheel is then said to have malfunctioned. Backup wheel 18 is then substituted in place of the malfunctioning wheel.

The circuit of FIG. 7 functions first to determine if the X axis 22 attitude error $\alpha_X$ 42 is within allowable limits. The input signal to the bipolarity comparator is the X axis attitude error $\alpha_x$ 42. Elements 201 and 198 acting as summing amplifiers will determine whether or not the attitude error 42 is less than or greater than a reference voltage $\pm E_{REFX}$. This reference voltage $\pm E_{REFX}$ is chosen to correspond to an outer limit, for example $\pm 0.5°$, which has been placed on the X axis attitude error. This limit is chosen such that if a wheel should malfunction, it does not introduce excessive attitude error before the malfunction is detected. If the X axis attitude error is greater in magnitude than $+ E_{REFX}$, the output of comparator 201 will be a pulse of positive voltage or a "one." The output of comparator 198 will be a pulse of negative voltage or a "zero" and the output of OR gate 202 is thus a positive pulse or a one. FETS 207a, 209 operate as ON/OFF switches. Normally they are in the OFF position. With the output of OR gate 202 a positive pulse; FET 207a closes and thereby conducts, thus allowing capacitor 207b to charge. The input from tachometer 208 is a voltage representative of X axis wheel 12 speed. Capacitor 207b charges to a voltage which is a sample of the input from tachometer 208. Capacitor 207B will hold its charge as FET 207c operating as a source follower has a very high input impedance and FET 207a becomes nonconducting and thus a high impedance at the end of the positive pulse output from OR gate 202. At the same time, with the output of OR gate 202 a one, one shot 203 is triggered and develops a positive pulse. In addition, the output of OR gate 202 is also connected to the X axis wheel 12 through suitable motor drives (not shown) causing wheel 12 to change its speed of rotation. As explained previously, the test for possible wheel malfunction is whether the wheel can change its speed of rotation a fixed amount over its present speed of rotation within a given interval of time. This interval of time is the duration of the positive pulse developed by one shot 203. The desired change in the speed of rotation is represented by the gain of operational amplifier 205. As is well known in the art, the gain of such an amplifier is determined by the ratio of the feed back resistor Rf 205a to the input resistor R 205b. The input to op. amp. 205 is the output of source follower 207c, which in turn is the voltage across capacitor 207b. As explained previously, the voltage across capacitor 207b represents the X wheel speed at the beginning of the speed-time test. Op. amp. 205 then multiplies the capacitor voltage by a factor greater than one, which represents the speed that the wheel should reach at the end of the given interval of time. For example, if the wheel speed should increase by 50% within the given time interval then the resistors Rf 205a and R 205b are adjusted to be in the ratio of 3 to 2 such that the output voltage of op. amp. 205 is 1 ½ times the voltage of capacitor 207b. At the end of the positive pulse developed by one shot 203, the trailing edge is inverted by inverter 204 thereby causing FET 209 to conduct. When FET 209 conducts, its output voltage is the voltage from tachometer 208. This voltage represents the speed X wheel 12 has reached at the end of the given interval of time. The inputs 211, 212 to comparator 210 are the outputs respectively of summing amplifier 205 and FET 209. If the X wheel 12 has been unable to change its speed the required amount in the given interval of time, the output of comparator 210 will be a positive voltage which will be placed on the D input of flip-flop 213. As is well known in the art, the D input commonly referred to as the "steering" determines whether flip-flop 213 will either set or reset. When a positive pulse is placed on the C or clock input of flip-flop 213, if the D input is positive, the flip-flop sets, if the D input is negative, the flip-flop resets. It is thus seen that when the output of comparator 210 is positive, flip-flop 213 will set at the occurrence of a positive pulse on the flip-flop's clock input. The clock pulse is developed by one shot 206 and occurs at the trailing edge of the output of one shot 203.

If the X wheel 12 has been able to change its speed, the required amount in the given interval of time the output of comparator 210 will not be a positive pulse, thus when the clock pulse occurs, flip-flop 213 will not set. When flip-flop 213 sets, it indicates that the X wheel 12 has failed the speed-time test.

If the X axis attitude error $\alpha_x$ remains large as compared to $E_{REFX}$ the test is repeated again. If the wheel fails, the test again, the output of comparator 210 is once again a positive pulse which goes to one input of AND gate 214 and to the steering input of flip-flop 213. With flip-flop 213 set, the other input to AND gate 214 is also a one and thus at the occurrence of the clock pulse flip-flop 215 sets. The setting of flip-flop 215 indicates that the X wheel 12 has failed the speed-time test twice in succession and thus the output 219 of flip-flop 215 corresponds to the second condition given in Table II. The requirement that the wheel fail the speed time test at least twice in a row before a malfunction is indicated insures that a single failure of the test does not indicate wheel malfunction.

If the X axis attitude error 42 is greater than $-E_{REFX}$ then the input to comparator 198 will be a negative voltage greater than $-E_{REFX}$. The output of comparator 198 will be a one, the output of comparator 201 will be a zero, and the output of OR gate 202 will be a one. A speed-time test will then be performed on the X wheel 12 in the manner described previously. Thus, it is seen that when the attitude error of the X axis is greater in absolute value than the absolute value of $E_{REFX}$, the X wheel 12 will be tested for a possible malfunction. If the attitude error falls between $\pm E_{REFX}$ then the output from comparators 201 and 198 will be a zero and the output of OR gate 202 will also be zero. FET 207a will remain closed and non-conducting and no speed-time test will be performed on X wheel 12.

The circuits for detecting and testing for malfunctions of the Y and Z axis wheels 14, 16 function in exactly the same manner as explained above for the X axis wheel 12 circuit. If the Y axis wheel 14 should fail at least two tests in a row, its output 220 represented by flip-flop 216 (FIG. 7) would give rise to the third condition of Table II. Similarly, if the Z axis 16 should fail at least two tests in a row, its output 221 represented by flip-flop 217 would give rise to the fourth condition of Table II. If the orthogonal wheels 12, 14, 16, are all functioning properly, their respective flip-flops 215, 216, 217 would all be reset and thus the output 222 of NAND gate 218 would be a one. The output 212 of NAND gate 218 corresponds to the first condition of Table II.

FIGS. 3 through 5 illustrate circuit diagrams of one embodiment of the three-axis control law determining apparatus. The invention may also be implemented by use of a properly programmed digital computer in combination with certain system elements to generate three-axis control laws in lieu of the hardware circuitry of FIGS. 3–5.

Figure 6:
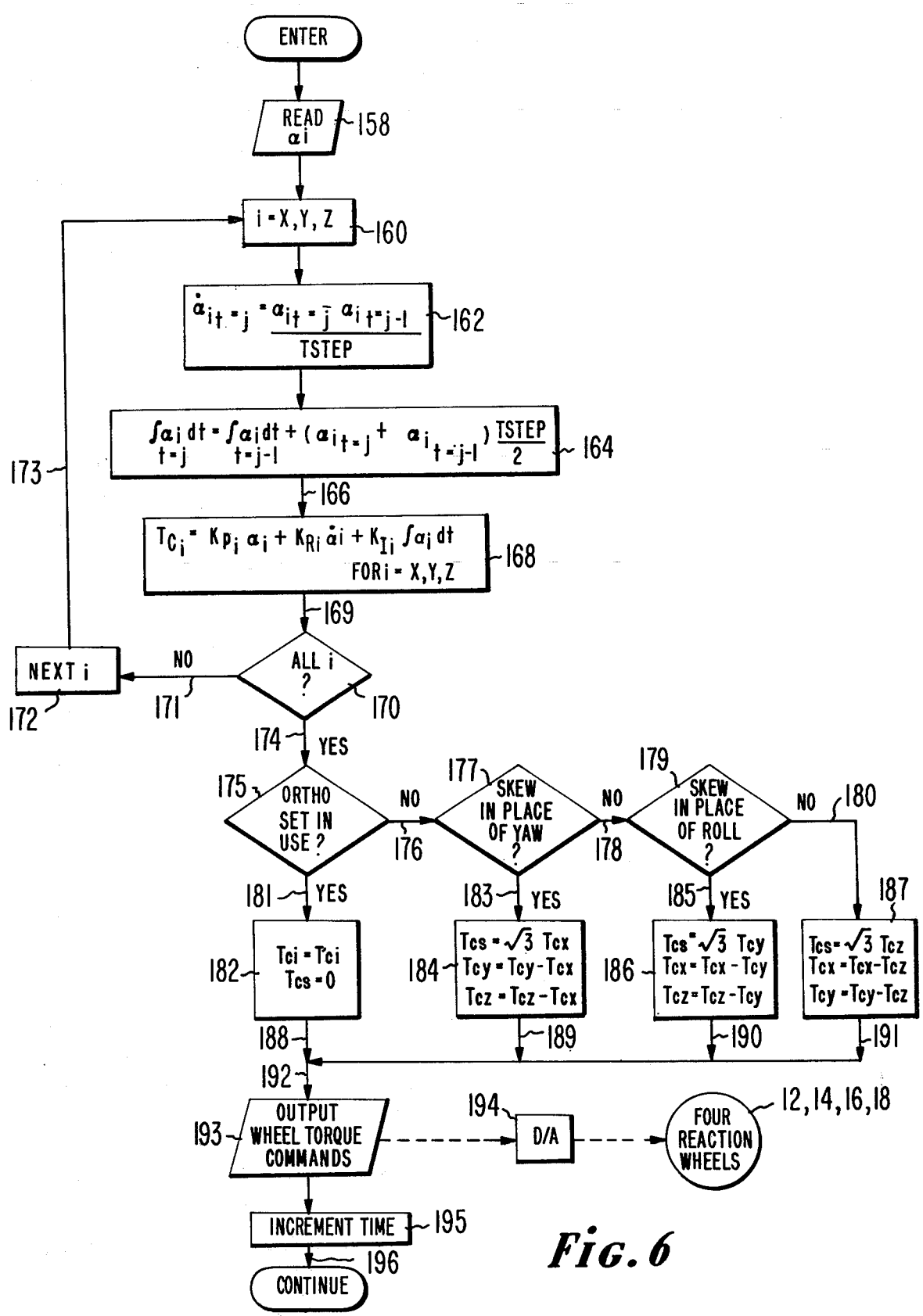
FIG. 6 is a flow chart of a wheel control torque algorithm for use in a computer utilizing the method of the present invention.

FIG. 6 illustrates a flow chart for a wheel control torque algorithm. The flow chart may be used for properly programming a digital computer in a manner well known in the programming art to perform the calculations performed by circuitry shown in FIGS. 3 through 5. The algorithm of FIG. 6, in brief, provides the steps to compute the wheel torque command signal for each wheel individually. For example, the algorithm will first compute the wheel torque command for the X axis wheel, then compute the wheel torque command for the Y axis wheel, and then for the Z axis wheel. These computations are performed at a particular instant of time. Once the wheel torque command has been computed for all three wheels, time is then incremented to a new interval or instant of time and the wheel torque commands for the three wheels are then calculated again. Once the wheel torque commands have been computed for the three mutually orthogonal wheels 12, 14, 16, the algorithm then determines if this orthogonal set of wheels 12, 14, 16, are operating properly. If not, the algorithm then replaces the wheel of the mutually orthogonal set 12, 14, 16 which is malfunctioning with the skew wheel 18. The algorithm then adjusts the wheel torque commands to the remaining wheels of the orthogonal set so that proper three-axis attitude control of spacecraft 10 will be maintained.

Proceeding now to a detailed description of FIG. 6, a parallelogram labelled 158 represents loading of the value of the attitude error along the yaw 22, roll 24, and pitch 26 axes into appropriate registers and the memory of the computer. As explained previously, these errors are determined by the three-axis attitude sensors 40. The first operation performed in the flow chart is labelled 160. It represents selecting one of the three orthogonal axes 22, 24, 26 of spacecraft 10, so that the wheel torque command for that axis may be calculated. Operations 162, 164, and 168, represent the calculation of the wheel torque command $T_{ci}$ for the selected axis. Each of these operations will now be described.

For the selected axis, the operation 162 calculates the attitude rate error. The attitude rate error is the rate of change of the attitude error over the given time interval. The attitude error at the present interval of time $t = j$ has been determined from attitude sensors 40. The attitude error at the prior instant of time $t = j -1$ has been previously stored in the memory of the computer. Operation 162 then calculates the difference between these two attitude errors divided by the interval of time T STEP which is equal to $t_{=j} - t_{=j-1}$. The program then proceeds to operation 164 wherein the integral term of the wheel torque command $T_{ci}$ is calculated. This integral term is calculated as the sum of the integral term at the prior interval of time $t = j -1$ previously stored in the computer memory and the increment or change in the integral term between the present instant of time $t = j$ and the prior instant of time $t = j -1$. The integral term calculated by operation 150 is stored in memory in place of the integral term calculated at $t = j -1$. Flow arrow 166 then directs the program to the operation labelled 168. Operation 168 calculates the wheel torque command $T_{ci}$ for the selected axis. As explained previously, in described Equation (1), the wheel torque command is the sum of a term which is directly related to the attitude error plus a term which is directly related to the attitude rate error as calculated in operation 162, and a term which is directly proportional or related to the integral of the attitude error as calculated in operation 164.

Flow arrow 169 directs the program to a decision operation 170 which determines whether or not the wheel torque command has been computed for the spacecraft's three mutually orthogonal axes 22, 24, 26. If a NO decision is made at decision operation 170, flow arrow 171, directs the program to operation 172 which selects the next axis, so that the wheel torque command may be computed for that axis. The program is then directed back to operation 160 by flow arrow 173.

If a YES decision is made at decision operation 170, this indicates that the wheel torque command has been computed for the three mutually orthogonal axes 22, 24, 26. Flow arrow 174 then directs the program to a diamond representing a decision operation 175. Decision operation 175 determines if the three orthogonal reaction wheels 12, 14, 16 are functioning or operating properly. If the decision is YES, there is then no need to use the backup wheel 18, and the program proceeds by flow arrow 180 to operation 182. Operation 182 indicates that as the three axis orthogonal set of wheels 12, 14, 16 are in use or operating, the wheel torque commands to these wheels 12, 14, and 16 will be those calculated in operation 168. As backup wheel 18 is not to be used, its wheel torque command $T_{cs}$ will be zero. Flow arrow 188 then directs the program to parallelogram 193 where the wheel torque commands are coupled to the motor drives of the reaction wheels 12, 14, 16 through a conventional D/A converter 194. The program then continues with operation 195 which increments time so that new wheel torque commands for the three axes 22, 24, 26 may be calculated. Flow arrow 196 then directs the program back to parallelogram 158.

If a NO decision is made at decision operation 175, this indicates that one of the orthogonal reaction wheels 12, 14, 16 is not operating properly or has malfunctioned. An orthogonal wheel 12, 14, 16 malfunctions when the wheel is unable to compensate for the attitude error on its associated axis 22, 24, 26. This failure to compensate may occur either because the wheel is not spinning at the proper speed or is spinning in the wrong direction or has stopped spinning for an extended period of time. The occurrence of any one of these conditions prevents the wheel from developing the torque needed to compensate for the attitude error. For each of reaction wheels 12, 14, 16, 18 there is provided in the memory of the computer used to implement the algorithm, a binary digit or bit. This binary digit will indicate the status of its associated reaction wheel. The status of each wheel may be determined as described previously for FIG. 7 by subjecting the wheel to a speed-time test if excessive attitude error occurs on the associated axis. For example, if the wheel is operating properly, its corresponding binary digit will be set to a 0. If the wheel is not operating properly, the bit will be a 1. This means that when the orthogonal wheels 12, 14, 16, are operating properly, the binary digits for these wheels 12, 14, and 16 will be zero and the bit representing the status of the backup wheel 18 will be a 1. If one of the orthogonal wheels 12, 14, 16 should not be operating properly, its corresponding bit in the memory of the computer will be set to a 1. By examining these bits, decision operation 175 can determine if the orthogonal set of wheels 12, 14, 16 are operating properly. If they are not, these bits will then indicate which one of the orthogonal wheels 12, 14, and 16 is not operating properly so that the backup wheel 18 may then be used in place of the malfunctioning orthogonal wheels 12, 14, 16. For a NO decision at decision operation 175, flow arrow 176 directs the program to decision operation 177. This decision operation 177 determines if it is the yaw or X axis reaction wheel 12, which is malfunctioning. It does so, as explained previously, by looking at the bits in memory which indicate the status of the reaction wheels 12, 14, 16, and 18. If a YES decision is made at decision operation 177, this indicates that the X axis reaction wheel 12 is no longer operating properly and that the backup wheel 18 must be substituted in place of the X axis reaction wheel 12. Flow arrow 183 then directs the program to operation 184, which adjusts the wheel torque commands to the remaining wheels of the orthogonal set which are still operating properly, which in this case will be Y and Z wheels 14, 16. Operation 184 also computes the wheel torque command to be issued to the skew axis wheel 18. The program then proceeds to parallelogram 192 where the wheel torque commands computed in operation 184 are coupled through conventional D/A converter 194, to the motor drives of reaction wheels 12, 14, 16, and 18. As explained previously, the program then proceeds to operation 195 and by flow arrow 196 to return to parallelogram 158.

A NO decision at decision operation 177, indicates that the yaw axis reaction wheel 12 is still functioning and therefore the program proceeds by flow arrow 178 to decision operation 179. Decision operation 179 determines if it is the roll axis reaction wheel 14 which is no longer operating properly. Once again it does this by examining the bits in memory which represent the status of reaction wheels 12, 14, 16, and 18. If a YES decision is made at decision operation 179, the program is directed to operation 186 which computes the wheel torque commands to the X and Z axis wheels 12, 16 and also the wheel torque command to the backup wheel 18. The program then proceeds as explained previously to parallelogram 192 where the wheel torque commands computed in operation 186 are coupled to reaction wheels 12, 14, 16, and 18.

If a NO decision is made at decision operation 179, the flow arrow 180 determines the next operation. It has previously been determined at decision operation 177 that the yaw axis reaction wheel 12 is still operating properly and it has further been determined at decision operation 179 that the roll axis reaction wheel 14 is also functioning. As there are only three wheels 12, 14 and 16 in the orthogonal set, the backup wheel 18 must be used in place of the Z axis or pitch wheel 16. Operation 187, then calculates the wheel torque commands to the X and Y axis wheels 12 and 14 and to the backup wheel 18. These wheel torque commands are then coupled to the corresponding reaction wheels 12, 14, 16, 18 through parallelogram 192. As has been explained previously, the program then proceeds to operation 195 which increments time so that a new set of wheel torque commands may be calculated at the next instant of time. The program then continues back to parallelogram 158 where the attitude errors at this new instant of time are read into the memory of the computer.

The flow chart of FIG. 6 illustrates one form of a wheel control torque algorithm. As known in the art, any suitable algorithm may be devised to generate the same or equivalent result.

It should be appreciated that the skewed backup wheel may have to rotate in either direction depending on which one of the orthogonal wheels malfunctions. When one of the orthogonal wheels malfunctions, the skewed wheel is used in place of that wheel and the skewed wheel acts in concert with the properly operating orthogonal wheels to maintain the desired spacecraft attitude. When either the roll or yaw axis wheel malfunctions, the skewed wheel undergoes two speed reversals per orbit for an earth pointing spacecraft.

A spacecraft attitude control system implementing the present invention provides several advantages. First, a lightweight and less costly three-axis attitude control system can be used which employs a single backup reaction wheel to be used in place of any one of the three mutually orthogonal wheels. This it will be appreciated, is in contrast to prior art three-axis attitude control systems which provide for either backup wheels on each axis or multiple reaction wheels arranged in a non-orthogonal system. Second, the three mutually orthogonal wheels have torque components only on their associated axes, which are principal axes of the spacecraft. Third, the use of a single skewed backup wheel provides for simplification of the wheel torque commands.

What is claimed is:

1. An attitude control system for a zero momentum satellite having three mutually perpendicular axes, comprising:
    a. attitude determination means mounted on said satellite for detecting deviations of each of said mutually perpendicular axes from a predetermined reference attitude and generating attitude error signals in response to said detected deviations of said predetermined attitude;
    b. three reaction wheels mounted on said satellite on a respective axis parallel with a respective one of each of said three mutually perpendicular axes, each of said wheels being rotationally bidirectional;
    c. not more than one additional reaction wheel mounted on said satellite on an axis parallel to an axis skewed to said three axes, said additional wheel being rotationally bidirectional;
    d. means responsive to attitude errors caused by a malfunction of one of said three mutually perpendicular wheels to generate signals to operate said additional wheel and modify the operation of the remaining two wheels of said three wheels such that the attitude deviation is reduced substantially to zero.

2. An attitude control system for a substantially zero momentum satellite having three mutually perpendicular axes, comprising:
    a. attitude determination means mounted on said satellite for detecting deviations of each of said mutually perpendicular axes from a predetermined reference attitude and generating attitude error signals in response to said detected deviations of said predetermined attitude;

b. three reaction wheels mounted on said satellite on a respective axis parallel with a respective one of each of said three mutually perpendicular axes, each of said wheels being rotationally bidirectional;

c. not more than one additional reaction wheel mounted on said satellite on an axis parallel to an axis skewed to said three axes, said additional wheel being rotationally bidirectional;

d. control means responsive to said attitude error signals for generating three torque command signals each associated with a respective one of each of said three mutually perpendicular wheels, each of said torque command signals causing the associated one of said respective wheels to rotate at an angular velocity and direction of rotation to correct and reduced substantially to zero any deviations that are detected;

e. means for detecting malfunctions of any one of said three mutually perpendicular wheels only and generating a signal indicating said malfunctions; and f. means included in said control means responsive to said malfunction signal for modifying said torque command signals and for generating a torque command signal to said additional wheel causing said additional wheel to rotate at an angular velocity and direction of rotation whereby said attitude deviations are reduced substantially to zero;

said deviations including deviations in attitude caused by a malfunction of one of said three mutually perpendicular wheels.

3. The system according to claim 2 wherein said attitude determination means includes gyroscopes mounted on each of said spacecraft's three mutually perpendicular axes.

4. The system according to claim 2 wherein said control means is a Type II servo and further includes:
a. means for generating a signal proportional to said attitude error signal;
b. means for generating a signal proportional to the rate of change of said attitude error;
c. means for generating a signal proportional to the integral of said attitude error; and
d. means for generating said torque command signals as the sum of said signal proportional to said attitude error, plus said signal proportional to said attitude rate error, plus said signal proportional to said integral of said attitude rate error.

5. The system according to claim 2 wherein said additional wheel is oriented 54.74° with respect to each of said three mutually perpendicular wheels.

6. The system according to claim 2 wherein said control signal modification means further includes:
means for subtracting from said torque command signals said torque command signal for said malfunctioning perpendicular wheel; and
means for calculating said torque command signal for said additional wheel as the product of a fixed constant times said torque command signal for said malfunctioning perpendicular wheels.

7. The system according to claim 6 wherein said fixed constant is the square root of three.

8. A method for controlling the attitude of a substantially zero momentum satellite, said vehicle having three mutually perpendicular axes, bi-directionally rotatable reaction wheels each mounted on a respective axis parallel with a respective one of said three mutually perpendicular axes, a fourth backup bi-directionally rotatable reaction wheel mounted on an axis skewed to said three mutually perpendicular axes at a given angle, comprising the steps of:
a. detecting deviations of each of said mutually perpendicular axes from a predetermined reference attitude;
b. generating attitude error signals corresponding to said detected deviations;
c. generating three torque command signals as a function of said attitude error signals, each of said torque command signals associated with a respective one of each of said three mutually perpendicular wheels;
d. detecting malfunctions of any one of said mutually perpendicular wheels;
e. generating a signal indicating said malfunction;
f. subtracting from each of said torque command signals a signal corresponding to the torque command signal of a wheel having manifested a malfunction signal;
g. generating a torque command signal for said fourth wheel as the product of a fixed constant related to said given angle times said torque command signal of said malfunctioning wheel; and
h. causing said fourth wheel to rotate at an angular velocity and direction of rotation whereby said attitude deviations are reduced substantially to zero, said deviations including deviations in attitude caused by a malfunction of any one of said three mutually perpendicular wheels.

9. The method of claim 8 in which the axis of said fourth wheel is oriented such that said given angle is 54.74° with respect to each of the axes of said three mutually perpendicular reaction wheels, and said fixed constant related to the given angle is the square root of three.

* * * * *